No. 841,594.
PATENTED JAN. 15, 1907.
J. R. SPEER & G. H. HARVEY.
METHOD OF SEPARATING SHEETS OF GLASS FROM THEIR BATHS.
APPLICATION FILED NOV. 23, 1906.
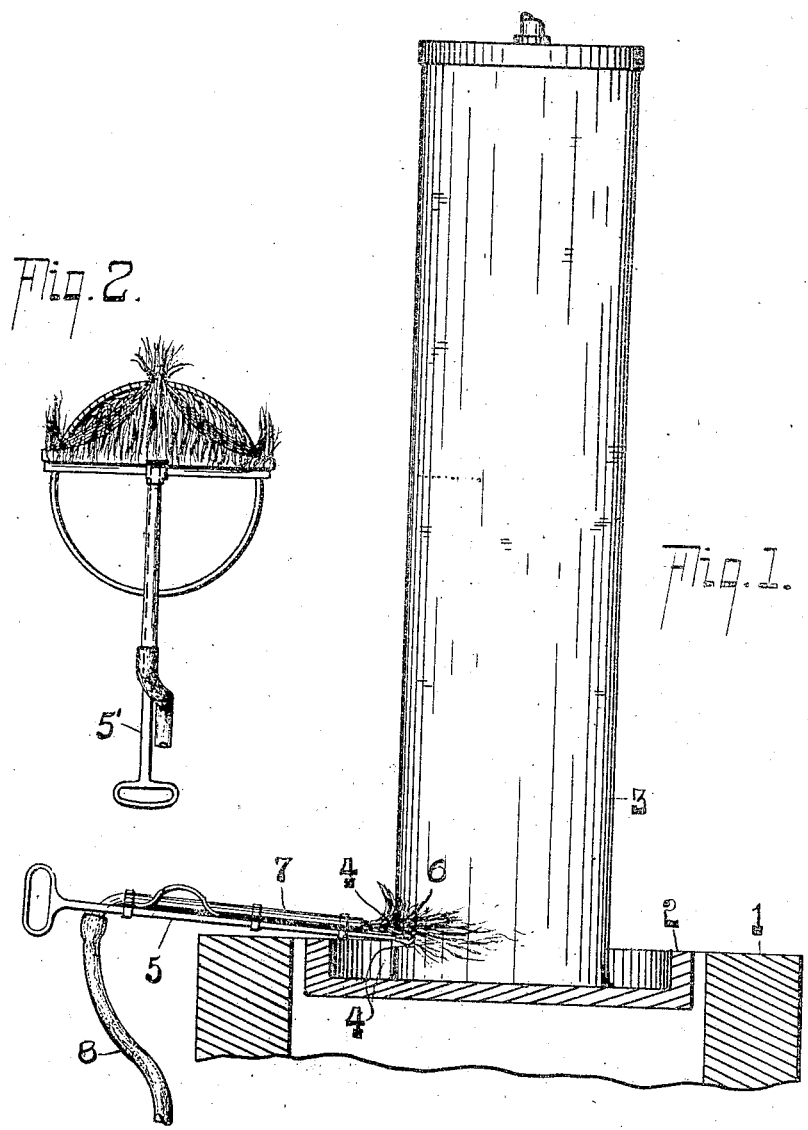
WITNESSES:
INVENTORS,
James R. Speer and George H. Harvey,
by their Attorney
F. N. Barber.

UNITED STATES PATENT OFFICE.

JAMES RAMSEY SPEER, OF PITTSBURG, AND GEORGE H. HARVEY, OF GLENFIELD, PENNSYLVANIA, ASSIGNORS TO BROWNSVILLE GLASS COMPANY, OF PITTSBURG, PENNSYLVANIA, A CORPORATION OF PENNSYLVANIA.

METHOD OF SEPARATING SHEETS OF GLASS FROM THEIR BATHS.

No. 841,594.      Specification of Letters Patent.      Patented Jan. 15, 1907.

Application filed November 23, 1906. Serial No. 344,707.

*To all whom it may concern:*

Be it known that we, JAMES RAMSEY SPEER, residing at Pittsburg, and GEORGE H. HARVEY, residing at Glenfield, in the county of Allegheny and State of Pennsylvania, citizens of the United States, have invented or discovered new and useful Improvements in Methods of Separating Sheets of Glass from Their Baths, of which the following is a specification.

During the drawing of sheet-glass of inclosed or other form from a bath of molten glass the sheet gradually changes from a plastic or ductile state at or near its junction with the bath to a hard brittle state at its junction with the bait. Hence the friability of the glass at the bait necessitates quick and dextrous action in separating the sheet from the glass in the bath or drawing-receptacle. By the practice commonly adopted the drawn glass is severed from the bath at the place where it is plastic, and the usual means for severing the hot glass are shears or other metallic instruments, which when brought into contact with the sheets are liable to cause them to check or crack transversely of the line of severance. As the severed glass cools the checks or cracks often continue along the sheet, rendering it practically worthless or at least damaging it materially.

It is the object of the present invention not only to sever the glass, but also to keep it in proper condition for severance and at the same time to prevent the checking or cracking of the glass or in case checks or cracks have been formed to close the same.

We have discovered that when a sheet is punctured and a flame is directed into the puncture the glass will part more readily than when the flame is directed against an unpunctured sheet and that if while using a tool to assist the flame to part the sheet checks or cracks begin to form they will be entirely closed by the fire-finishing action of the flame. We have discovered, however, that by our improved method there is but little or no tendency of the sheets to check or crack, because the edge of the glass is softened in advance of the action of the parting-tool thereon and is subject to the action of the flame after the tool has passed, the softened glass cooling gradually to form an unchecked fire-finished surface.

Referring to the drawings which accompany this specification, Figure 1 is an elevation of one form of apparatus used in connection with our method, the furnace-wall and the drawing-pot being in vertical section; and Fig. 2, a view taken on the plane of severance with a modified severing-tool, the cylinder above the plane being omitted.

In the drawings, 1 represents the upper portion of a furnace, and 2 the pot from which the glass cylinder 3 has been drawn.

4 is a puncture in the glass made by the tool 5 at the level at which it is desired to sever the glass. The puncturing-tool 5 preferably has an arrow-head 6, shown in the puncture.

7 is a pipe connected, if preferred, to the tool 5, the pipe being connected to a flexible gas-feeding pipe or hose 8.

After the glass sheet has been drawn to the desired length the attendant directs the flame issuing from the pipe 7 against the sheet the level at which he desires to separate it from the bath or pot. When the glass has the required softness, he thrusts the arrow-head 5 through the same at the point where the flame has been directed. The flame follows the tool, which may be rotated to enlarge the puncture, and heats both end walls thereof, causing the glass there to be softened, so that it separates progressively from the puncture horizontally entirely across the cylinder.

In case the glass should become too cool or for any other reason the flame should not be able to cut its way around the cylinder from the puncture it may be assisted by the arrow-head or other tool, which would engage the softened glass and complete the severance. In Fig. 2 we have shown a tool 5', which may be used to make the puncture and then assist the flame to sever the remaining part of the glass wall. The tool 5' has a wide arrow-head, its width being preferably such that when thrust through the puncture and across the cylinder it will at one thrust cut through the whole cylinder—that is, the width of the arrow-head is preferably equal to or greater than the diameter of the cylinder. Of course a narrower tool could be used and each wall of the puncture could be acted on separately.

We do not restrict ourselves to the form of tools shown or to any other limitation not imposed by the prior art. Our invention is applicable to plane as well as to cylindrical sheets of glass.

We claim—

1. The method of separating a sheet of glass from the drawing-receptacle, which consists in making a puncture in the same and applying a flame in the puncture.

2. The method of separating a sheet of glass from the drawing-receptacle, which consists in making a puncture in the same, applying a flame in the puncture, and parting the sheet beginning at the puncture.

3. The method of separating a sheet of glass from the drawing-receptacle, making a puncture in the same, applying a flame to the puncture to sever the remaining portion of the sheet, and fire-finishing the glass adjacent to the severed edge thereof.

4. The method of separating a sheet of glass from the drawing-receptacle, making a puncture in the same, applying a flame to the puncture to sever the remaining portion of the sheet, parting the sheet beginning at the puncture, and fire-finishing the glass adjacent to the severed edge thereof.

5. The method of treating drawn glass which consists in heating the glass at the level at which it is to be severed, puncturing the sheet where so heated, applying a flame to soften the edges of the puncture transversely of the sheet, applying a parting-tool to the softened edge of the glass, and fire-finishing the edge of the severed glass.

Signed at Pittsburg, Pennsylvania, this 12th day of November, 1906.

JAMES RAMSEY SPEER.
GEORGE H. HARVEY.

Witnesses:
ELVA STANICH,
C. E. EGGERS.